(12) United States Patent
Okada et al.

(10) Patent No.: US 12,106,772 B2
(45) Date of Patent: Oct. 1, 2024

(54) METHODS FOR INCREASING STORAGE CAPACITY AND IMPROVING PERFORMANCE IN DUAL-REEL REMOVABLE TAPE DEVICES AND FIXED TAPE DEVICES

(71) Applicant: Western Digital Technologies, Inc., San Jose, CA (US)

(72) Inventors: Keiichi Okada, Yokohama (JP); Akira Sakagami, Kanagawa (JP); Takehiko Hamaguchi, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/355,106

(22) Filed: Jul. 19, 2023

(65) Prior Publication Data
US 2024/0249747 A1    Jul. 25, 2024

Related U.S. Application Data

(60) Provisional application No. 63/480,583, filed on Jan. 19, 2023.

(51) Int. Cl.
*G11B 15/56* (2006.01)
*G11B 5/008* (2006.01)
*G11B 15/00* (2006.01)

(52) U.S. Cl.
CPC .......... *G11B 15/56* (2013.01); *G11B 5/00813* (2013.01); *G11B 15/005* (2013.01)

(58) Field of Classification Search
None
See application file for complete search history.

(56) References Cited

U.S. PATENT DOCUMENTS 4,414,593 A * 11/1983 Miller ................ G11B 5/00817
4,858,039 A *  8/1989 Mintzlaff ............. G11B 27/107
(Continued)

OTHER PUBLICATIONS

"Overview—3570 Magstar MP Tape Library" Product Documentation, IBM, Document No. 806374; modified date: Jan. 24, 2019—www.ibm.com/support/pages/overview-3570-magstar-mp-tape-library (Year: 2019).*

(Continued)

*Primary Examiner* — William J Klimowicz
(74) *Attorney, Agent, or Firm* — PATTERSON + SHERIDAN, LLP

(57) ABSTRACT

The present disclosure generally relates to increasing storage capacity for magnetic media dual-reel tape devices, and more specifically modifying the writing process to the magnetic media. Rather than having an unused acceleration zone, portions or even the entire acceleration zone on the tape can be used to store data. To achieve the acceleration to a predetermined speed, the tape is wound in the opposite direction from where the writing and/or reading will occur. The winding is of a sufficient distance to create sufficient distance along the tape for the acceleration to the predetermined speed to be completed by the time the writing and/or reading location is reached. Furthermore, when the acceleration zone is completely used for data, writing can occur from the beginning of the tape to the end of the tape rather than writing to/from the acceleration zone and then returning to a corresponding end of the tape.

19 Claims, 17 Drawing Sheets

(56) References Cited

U.S. PATENT DOCUMENTS

| | | | |
|---|---|---|---|
| 5,881,960 | A | 3/1999 | Christie |
| 6,204,987 | B1* | 3/2001 | Dahlerud ................ G11B 15/20 |
| 8,009,377 | B2 | 8/2011 | Neumann |
| 8,027,109 | B1* | 9/2011 | Lyman ................ G11B 5/00821 360/13 |
| 9,251,827 | B2 | 2/2016 | Cherubini et al. |
| 10,388,312 | B2 | 8/2019 | Bui et al. |
| 11,081,132 | B1 | 8/2021 | Chew |
| 2005/0088771 | A1* | 4/2005 | Jaquette ................ G11B 15/46 360/73.04 |
| 2006/0044665 | A1* | 3/2006 | Clemons ................ G11B 5/584 |
| 2006/0044673 | A1* | 3/2006 | Clemons .......... G11B 23/08757 360/96.1 |
| 2006/0274446 | A1 | 12/2006 | Johnson et al. |
| 2009/0063763 | A1* | 3/2009 | Katagiri ........... G11B 20/10527 711/111 |
| 2009/0103205 | A1* | 4/2009 | Oishi ................. G11B 5/00813 360/77.12 |
| 2011/0122522 | A1 | 5/2011 | Itagaki et al. |
| 2011/0176237 | A1 | 7/2011 | Bui et al. |
| 2011/0267717 | A1 | 11/2011 | Cherubini et al. |
| 2012/0307399 | A1* | 12/2012 | Hoerger ............. G11B 20/1201 360/134 |
| 2022/0059125 | A1* | 2/2022 | Malina .................... G11B 5/54 |

OTHER PUBLICATIONS

Giovanni Cherubini, "Advanced Control Systems for Data Storage on Magnetic Tape: A Long-Lasting Success Story", EEE Control Systems, Aug. 2022.

Gniewek, John J., "Towards Improved Tape Storage and Retrieval Response Time", IBM Corporation, 1998, pp. 81-94, Last date accessed Jun. 27, 2024, <https://msstconference.org/MSST-history/1998/papers/b3-1-GNIEWE.pdf>.

* cited by examiner

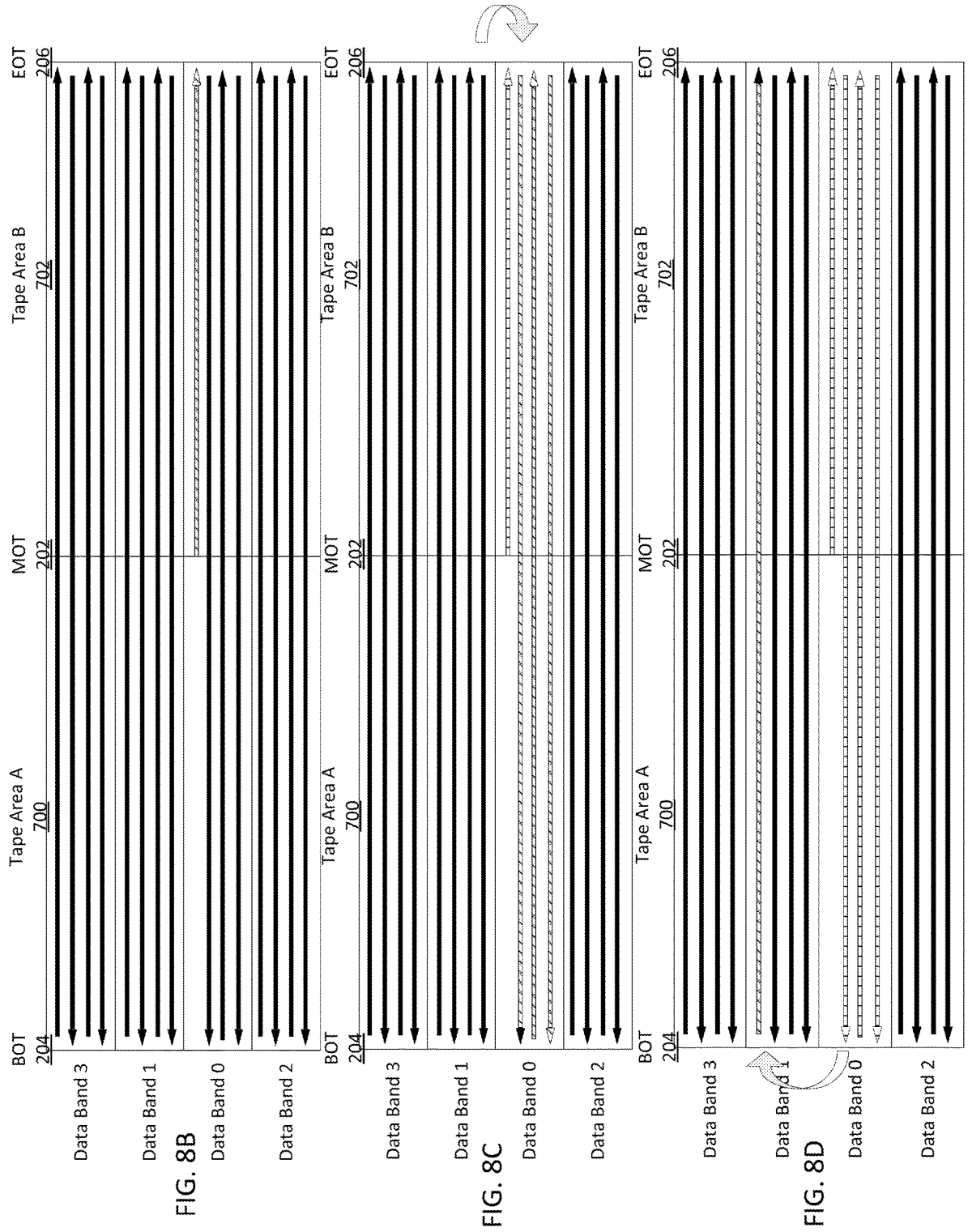

METHODS FOR INCREASING STORAGE CAPACITY AND IMPROVING PERFORMANCE IN DUAL-REEL REMOVABLE TAPE DEVICES AND FIXED TAPE DEVICES

CROSS-REFERENCE TO RELATED APPLICATIONS

This application claims benefit of U.S. Provisional Patent Application Ser. No. 63/480,583, filed Jan. 19, 2023, which is herein incorporated by reference.

BACKGROUND OF THE DISCLOSURE

Field of the Disclosure

Embodiments of the present disclosure generally relate to increasing storage capacity for magnetic media dual-reel tape devices, and more specifically modifying the writing process to the magnetic media.

Description of the Related Art

In dual-reel removable tape devices and fixed tape devices, the tape media is wound on two reels, which has the feature of shorter access time compared to single-reel tape devices that are widely used in the tape market today. In order to fully utilize the shorter access time, a method called midpoint loading is commonly known.

Midpoint loading refers to a method in which the tape media wound around each tape reel are equal in length to one another, and the tape head waits at the midpoint of half the total tape length in the default state. In operation, the tape is read and/or written to while the tape is in motion. The tape moves at a predetermined speed for the reading and/or writing to reach the predetermined speed from a position of not moving involves accelerating tape. Hence, there is an acceleration zone where data is not written because the tape, when accelerated from a stopped position, will not be moving at the predetermined speed. Thus, current implementation of midpoint loading sacrifices storage capacity around the midpoint of the tape.

Therefore, there is a need in the art for increasing storage capacity of dual-reel tape devices while maintaining shorter access times.

SUMMARY OF THE DISCLOSURE

The present disclosure generally relates to increasing storage capacity for magnetic media dual-reel tape devices, and more specifically modifying the writing process to the magnetic media. Rather than having an unused acceleration zone, portions or even the entire acceleration zone on the tape can be used to store data. To achieve the acceleration to a predetermined speed, the tape is wound in the opposite direction from where the writing and/or reading will occur. The winding is of a sufficient distance to create sufficient distance along the tape for the acceleration to the predetermined speed to be completed by the time the writing and/or reading location is reached. Furthermore, when the acceleration zone is completely used for data, writing can occur from the beginning of the tape to the end of the tape rather than writing to/from the acceleration zone and then returning to a corresponding end of the tape.

In one embodiment, a data storage device comprises at least one head configured to access a magnetic tape; one or more reels configured to wind and unwind the magnetic tape; one or more motors configured to actuate the one or more reels; and control circuitry configured to: receive a read or write request; determine a first distance from a middle of the magnetic tape to a location on the magnetic tape for data corresponding to the read or write request; position the magnetic tape to allow for an acceleration length to be traveled before reaching the location, wherein the acceleration length is greater than the first distance from the middle of the magnetic tape to the location on the magnetic tape for data corresponding to the read or write request; accelerate the magnetic tape over the acceleration length; and perform the read or write request.

In another embodiment, a data storage device comprises at least one head configured to access a magnetic tape; one or more reels configured to wind and unwind the magnetic tape; one or more motors configured to actuate the one or more reels; the magnetic tape, wherein the magnetic tape has a Beginning of Tape (BOT) portion of the magnetic tape, a Middle of Tape (MOT) portion of the magnetic tape, and an End of Tape (EOT) portion of the magnetic tape; and control circuitry configured to: write data continuously from the BOT portion through the MOT portion and the EOT portion; and either: initially writing from the BOT portion; or initially writing from a middle of the MOT portion.

In another embodiment, a data storage device comprises at least one head configured to access a magnetic tape; one or more reels configured to wind and unwind the magnetic tape; one or more motors configured to actuate the one or more reels; the magnetic tape, wherein the magnetic tape has a BOT portion of the magnetic tape, a MOT portion of the magnetic tape, and an EOT portion of the magnetic tape; and control circuitry, wherein the control circuitry is configured to: cause the magnetic tape to move in multiple directions to execute a write command; and write data continuously from the BOT portion through the MOT portion and the EOT portion.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 8A-8D illustrate a possible solution for the storage loss illustrated in FIG. 7.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to increasing storage capacity for magnetic media dual-reel tape devices, and more specifically modifying the writing process to the magnetic media. Rather than having an unused acceleration zone, portions or even the entire acceleration zone on the tape can be used to store data. To achieve the acceleration to a predetermined speed, the tape is wound in the opposite direction from where the writing and/or reading will occur. The winding is of a sufficient distance to create sufficient distance along the tape for the acceleration to the predetermined speed to be completed by the time the writing and/or reading location is reached. Furthermore, when the acceleration zone is completely used for data, writing can occur from the beginning of the tape to the end of the tape rather than writing to/from the acceleration zone and then returning to a corresponding end of the tape.

Figure 1A:
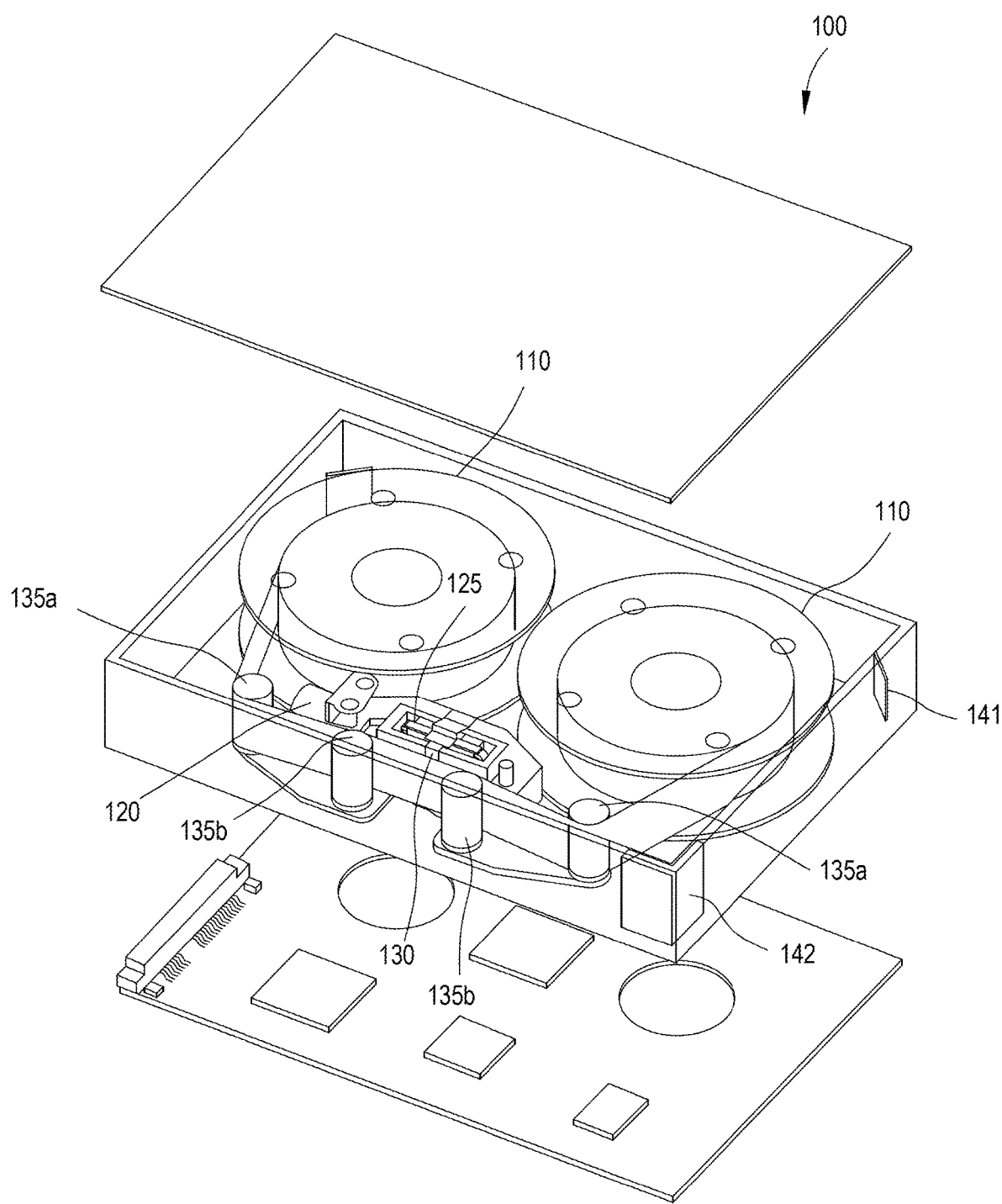
FIGS. 1A-1C illustrate a perspective exploded view, a simplified top down, and side profile view of a tape drive, in accordance with some embodiments.
Figure 1B:
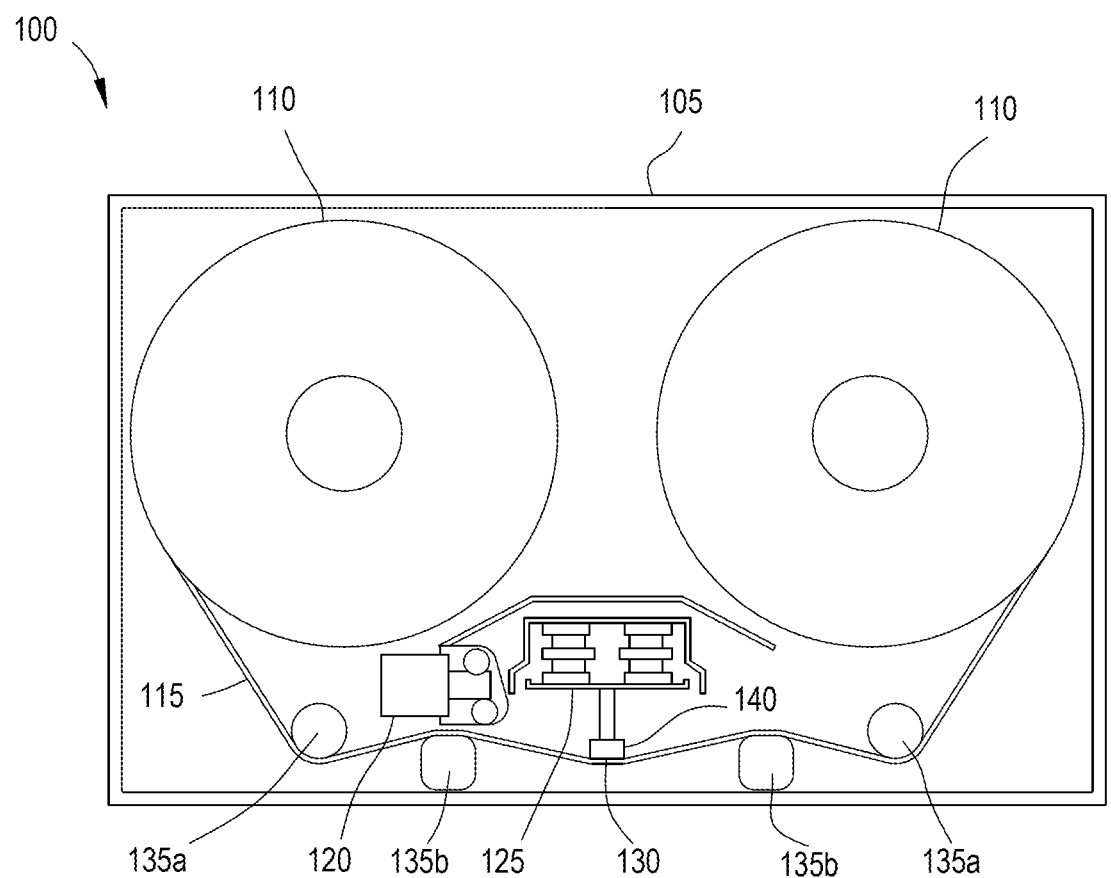
Figure 1C:
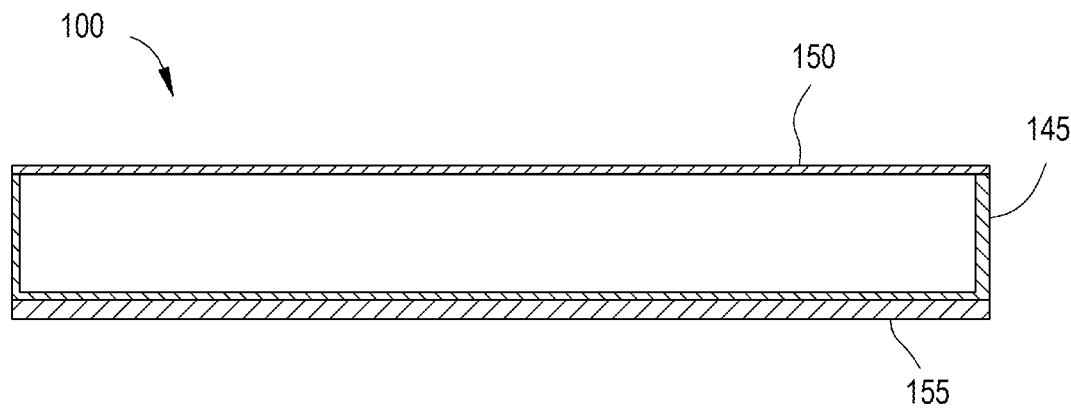

FIGS. 1A-1C illustrate a perspective exploded view, a simplified top down, and side profile view of a tape drive 100, in accordance with some embodiments. The tape drive 100 may be a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
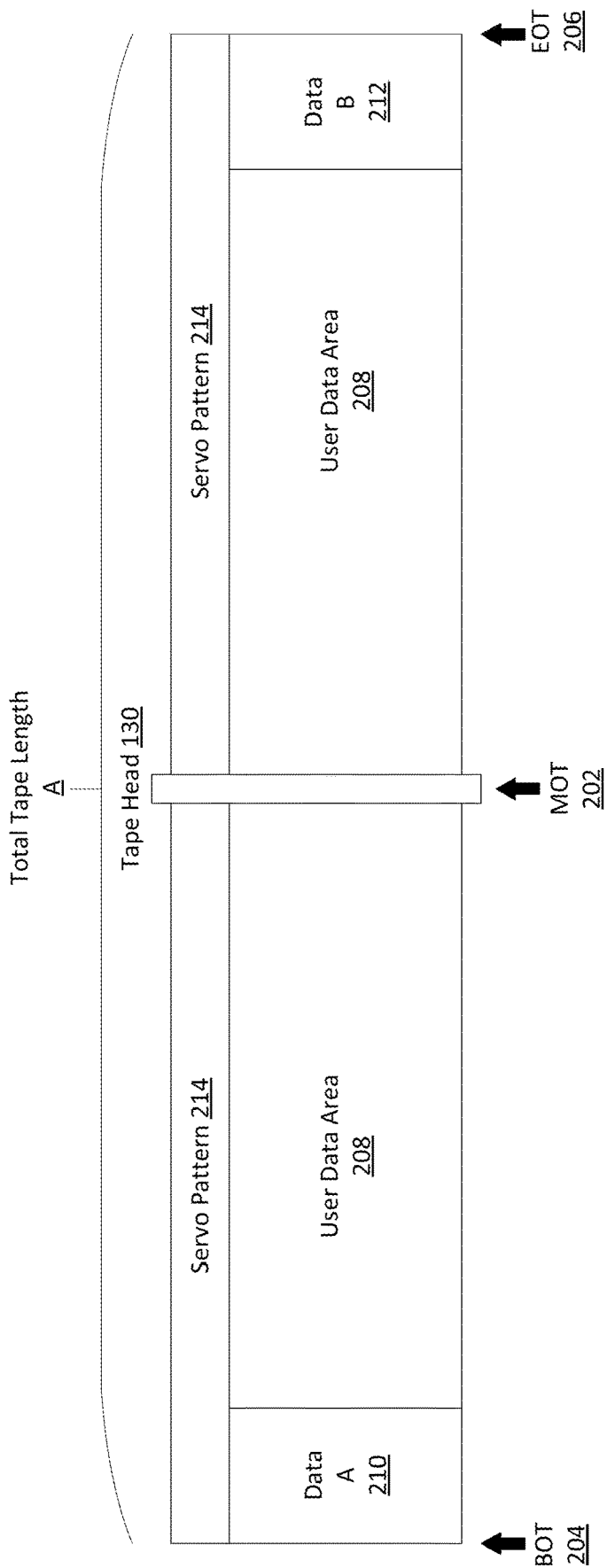
FIG. 2 is a depiction of a method of magnetic tape operation known as Midpoint Loading.

FIG. 2 is a depiction of a method of magnetic tape operation known as Midpoint Loading. In the midpoint loading method, the tape head 130 is located at the Middle of Tape (MOT) 202 during standby. Standby can be either an initial state or when there is no media access for a set period of time. The tape head 130 is located at the MOT 202 so that in both of the two cases where the access time is the longest (i.e., at the ends of the tape), the travel distance is half of the total tape length A and the access time is identical. For example, accessing data A 210 near the Beginning of Tape (BOT) 204 and accessing data B 212 near the End of Tape (EOT) 206 would take equal travel distance and access time. In other words, the Midpoint Loading method is the method with the shortest maximum access time. From the viewpoint of using Midpoint Loading with a tape device, guaranteeing this shortest maximum access time is one of the specifications of the device for Quality of Service (QOS) measurements.

Additionally, linear tapes such as shown in FIG. 2 typically have servo patterns 214 that are generally written continuously from BOT 204 to EOT 206 in an area independent of any user data area 208. The design allows for servo acquisition at any location on the tape.

Figure 3:
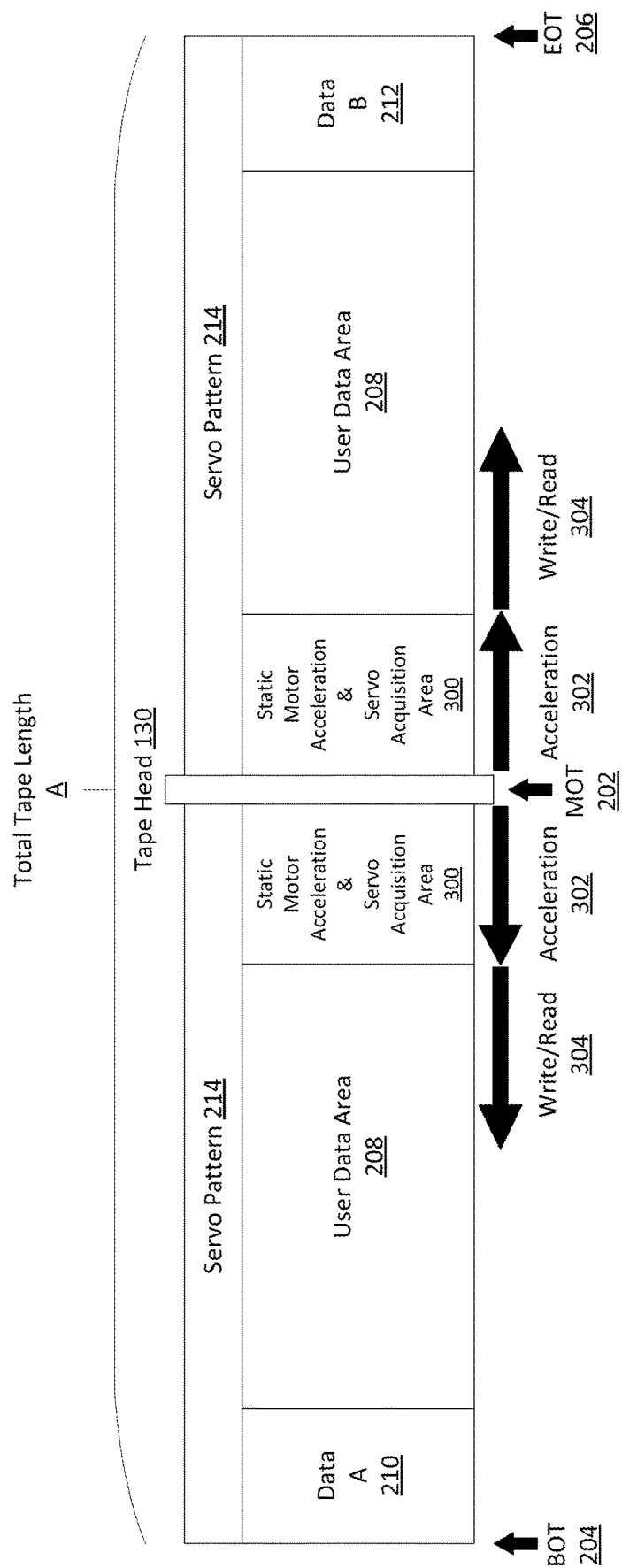
FIG. 3 is a diagram depicting storage loss with Midpoint Loading methods.

FIG. 3 is a diagram depicting storage loss with Midpoint Loading methods. During operation, the device exits standby and moves the tape to a location on the tape where data is to be written or read. The tape moves at a predetermined speed. To achieve the predetermined speed, the tape is accelerated through an acceleration zone. The tape hence has an acceleration area for when the tape moves towards the BOT 204 from the MOT 202 and another acceleration area for when the tape moves towards the EOT 206 from the MOT 202. The two acceleration areas are collectively an acceleration zone. A common method to reduce access time is to provide a static motor acceleration and servo acquisition area 300 (i.e., the acceleration zone) in both directions from the MOT 202 to reach the user data area 208 beyond the acceleration zone in the shortest possible time. The method allows for the shortest possible access time for data along the total tape length A, for example data A 210 or data B 212. The static motor acceleration and servo acquisition area 300 allows the one or more motors to accelerate 302 the tape to an operational speed for writing 304.

In the case shown in FIG. 3, data is not recorded in the static motor acceleration and servo acquisition area 300, resulting in loss of storage capacity instead of access time reduction. Data cannot be recorded because the tape cannot reach an operational speed (i.e., the predetermined speed) for writing 304 within the length of the static motor acceleration and servo acquisition area 300. For example, if the total tape length A is 500 m and a static motor acceleration and servo acquisition area 300 is 5 m, the total capacity loss of the tape is approximately 2%, which is considered a non-negligible loss.

Figure 4:
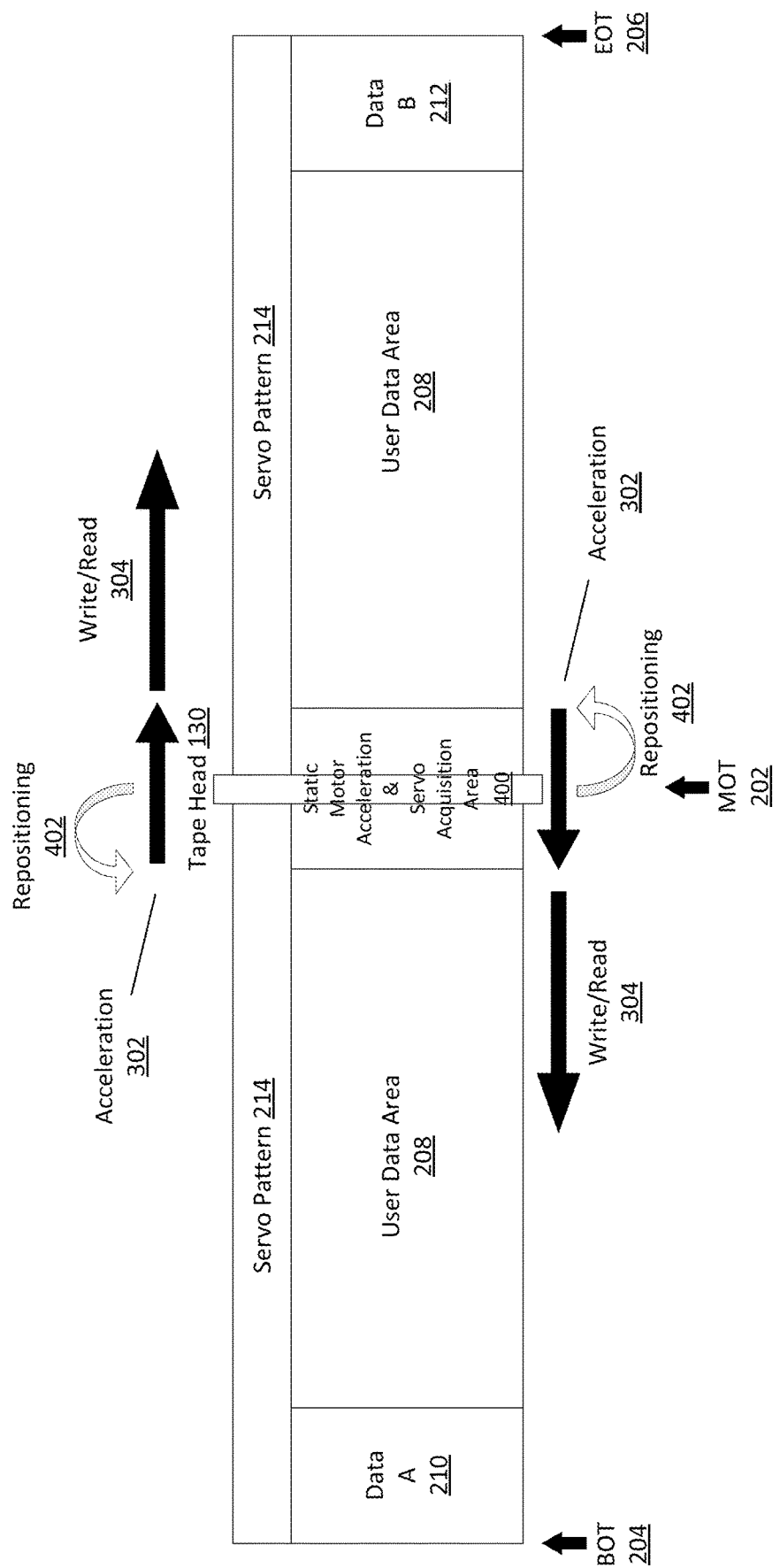
FIG. 4 is a diagram of a possible solution to the storage loss of FIG. 3.

FIG. 4 is a diagram of a possible solution to the storage loss of FIG. 3. Shortening the total static motor acceleration and servo acquisition area 400 makes it possible to increase storage capacity by that amount. As an example, FIG. 4 shows a case in which the static motor acceleration and servo acquisition area 400 is halved compared to FIG. 3. In this case, the storage capacity can be increased by about 1% compared to the conventional method as shown previously in FIG. 3.

When data is written and read back near the MOT 202, writing and reading data is performed after a repositioning 402. The repositioning of the tape involves moving the tape in the direction opposite the write or read so that the tape head 130 is positioned over the end of the static motor acceleration and servo acquisition area 300. The tape will then have the full length of the static motor acceleration and servo acquisition area 300 to travel to reach operational speeds to execute writes or reads in the vicinity of the MOT 202. In this instance extra time is required for the repositioning 402, typically several seconds, in exchange for the total storage capacity to be increased.

When accessing the data with the longest access time in the vicinity of the BOT 204 or EOT 210, like data A 210 and data B 212 respectively, the access time is not affected at all in exchange for the extra storage capacity near the MOT 202. The distance between the MOT and the data A 210 and data B 212 is sufficient to accelerate the tape to the predetermined speed and hence, a distinct acceleration zone is not needed and thus, repositioning is not needed. Repositioning 402 is used in only a small percentage of write and read cases, so the impact of the extra repositioning time is extremely small.

Figure 5:
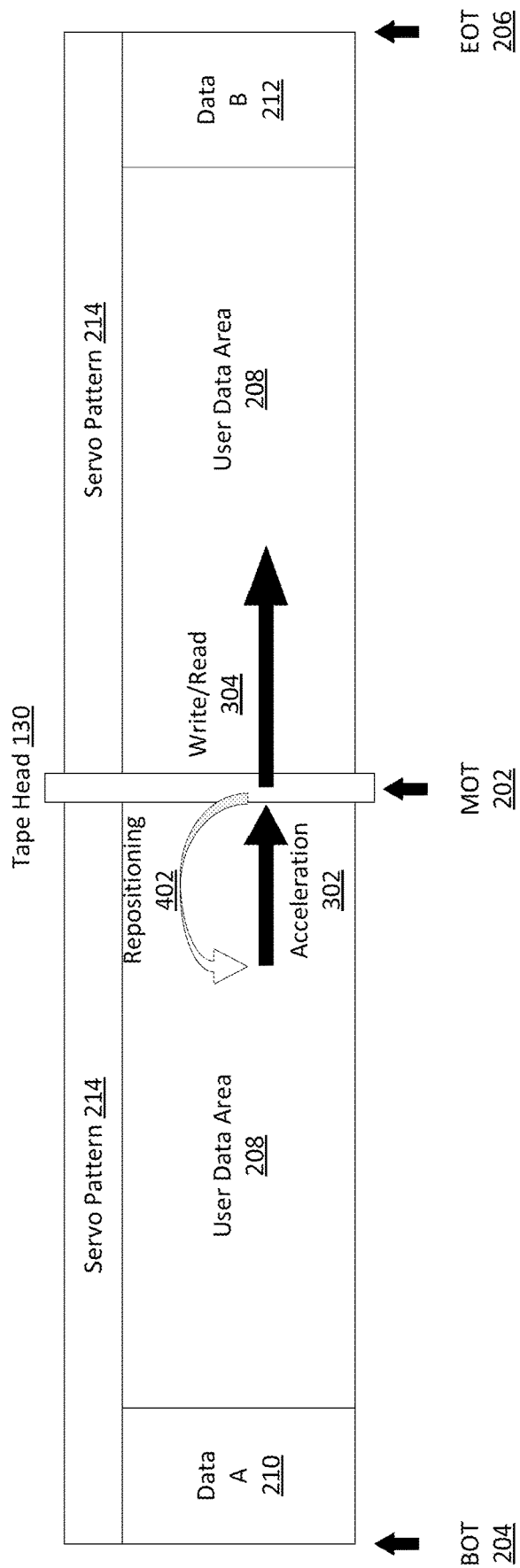
FIG. 5 is a diagram of another possible solution to the storage loss of FIG. 3.

FIG. 5 is a diagram of another possible solution to the storage loss of FIG. 3. By fully eliminating the static motor acceleration and servo acquisition areas and using the entire length of the tape as user data area 208, it is possible to increase the storage capacity by an additional 1% compared to the previously displayed solution in FIG. 4, and a total capacity increase of up to 2% is expected when compared to the method shown in FIG. 3. As such, the entire tape can be used for data storage.

Although the repositioning 402 time is slightly longer than that of the solution shown in FIG. 4, it is possible to further increase the storage capacity with no effect on the access time of data near the BOT 204 and EOT 206, which has the longest access time. Only data within the vicinity of the MOT 202 gain the extra repositioning time, where the vicinity is considered a distance from the MOT 202 equal to the length of the eliminated static motor acceleration and servo acquisition area. Further, as data is located further from the MOT 202 while still being within the vicinity of the MOT 202, the repositioning time needed is reduced because less repositioning 402 of the tape is required.

Figure 6:
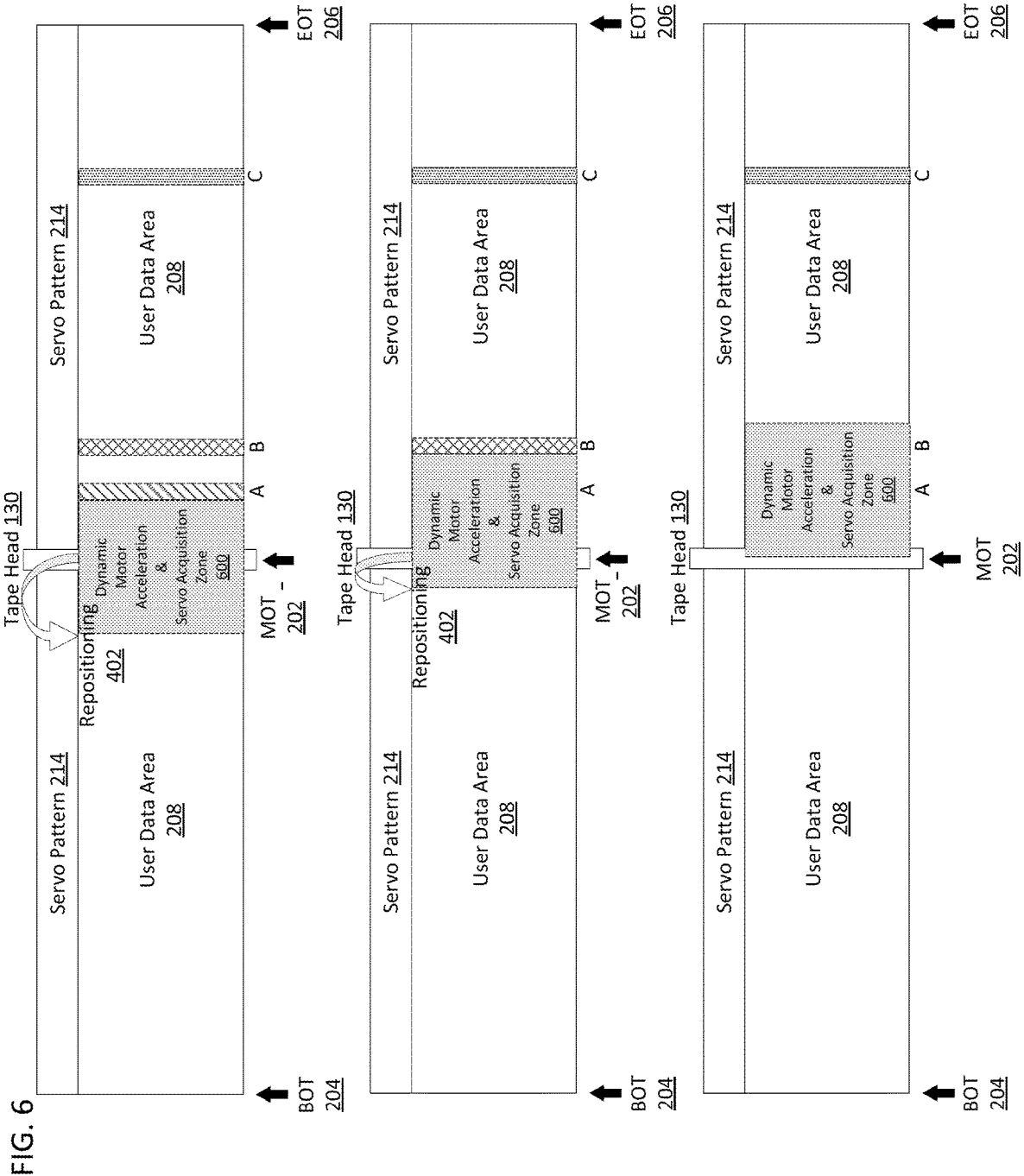
FIG. 6 is a display of three different scenarios of writing data while implementing the solution of FIG. 5.

FIG. 6 illustrates three different scenarios of writing data while implementing the solution of FIG. 5. A dynamic motor acceleration and servo acquisition zone 600 is displayed in each scenario to help visualize the distance for acceleration, however the zone 600 does not physically exist on the tape itself.

The first scenario displayed shows the repositioning 402 that occurs to read or write data at section A. As section A is within the vicinity of the MOT 202, the tape is repositioned to allow the dynamic motor acceleration and servo acquisition zone 600 to be traveled before reaching section A.

The second scenario displayed shows the repositioning 402 that occurs to read or write data at section B. As section B is also within the vicinity of the MOT 202, the tape is repositioned. However, as section B is further from the vicinity of the MOT 202 as compared to section A, the tape does not need to be repositioned as far, therefore less time is needed to reposition as compared to section A before accessing section B.

The third and final scenario displayed shows that no repositioning occurs when data is outside of the vicinity of the MOT 202. Because the tape needs to be moved to access section C, the one or more motors sufficiently accelerate while moving the tape to access section C. Therefore, no additional time is added to reposition tape for any scenario when data falls outside of the vicinity of the MOT 202.

Figure 7:
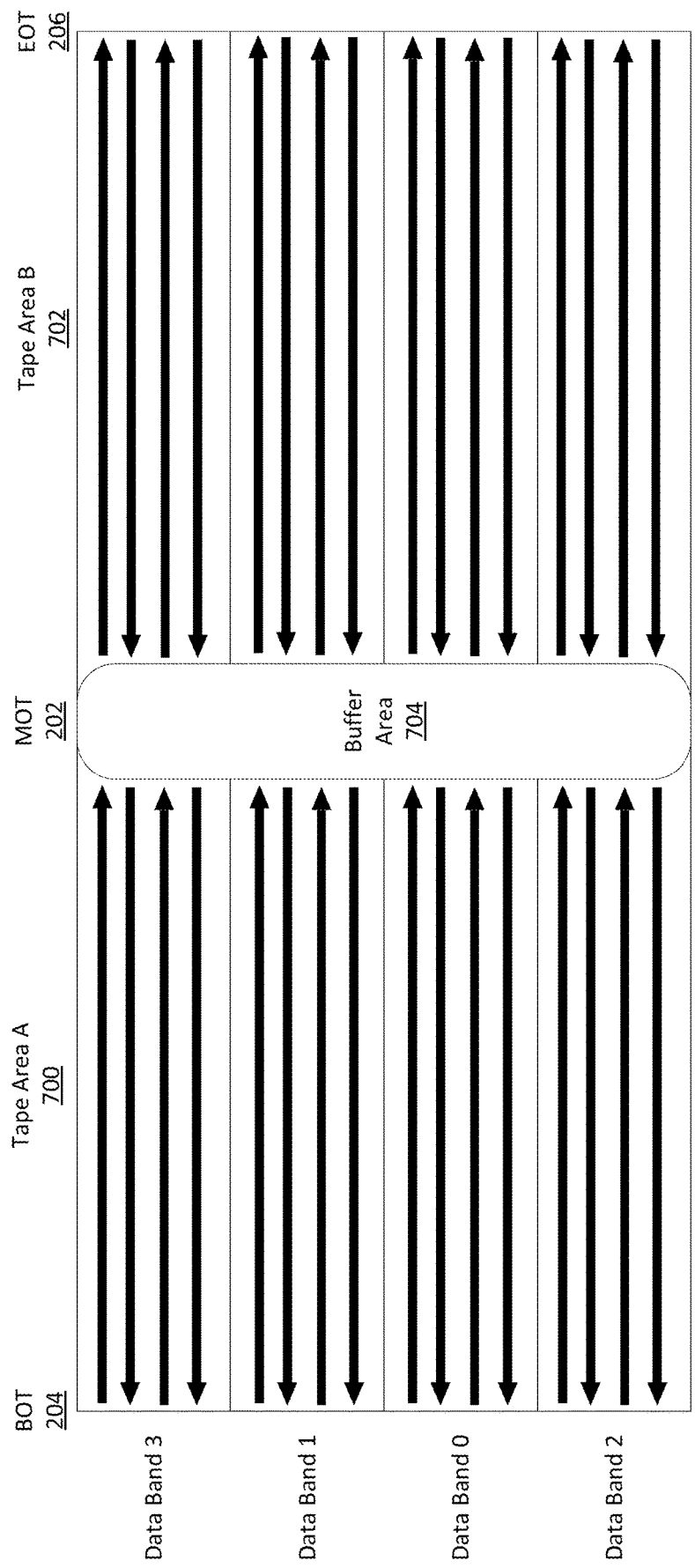
FIG. 7 is a diagram of storage loss related to Midpoint Loading and data band layout.

FIG. 7 is a diagram of storage loss related to Midpoint Loading and data band layout. In the case where four data bands exist on the tape media, such as Linear Tape-Open (LTO), the Midpoint Loading method is typically used. In the usual case, to take advantage of Midpoint Loading, the data band layout is divided into two parts, tape area A 700 from BOT 204 to MOT 202, and tape area B 702 from MOT 202 to EOT 206 with a buffer area 704 (i.e., acceleration zone) located around the MOT 202. When writing to these areas, the tape head 130 is folded back for each wrap within tape area A 700 and tape area B 702.

This data band layout creates two problems. When writing and reading the entire tape capacity, the number of wrap turn operations is twice that of a single reel tape system, resulting in performance degradation. Additionally, the buffer area 704 near the MOT prevents either tape area from being overwritten. The buffer area 704 results in a loss of total capacity as data is not stored in the buffer area 704.

FIGS. 8A-8D illustrate a possible solution for the storage loss illustrated in FIG. 7. Rather than using the standard concept of dividing the tape area into two tape areas (i.e., tape area A 700 and tape area B 702), the tape head 130 may begin writing on an unused tape from the MOT 202 portion and then write between the BOT 204 portion and EOT 206 portion without any wrap turn at the MOT 202 portion. By eliminating the wrap turn at the MOT 202, the number of wrap turns is the same as that of a single-reel tape system and the performance degradation associated is eliminated. In addition, because there are no wrap turns at the MOT 202, continuous writing is possible and the capacity loss associated with the buffer area 704 of FIG. 7 near the MOT 202 is also eliminated.

Figure 8A:
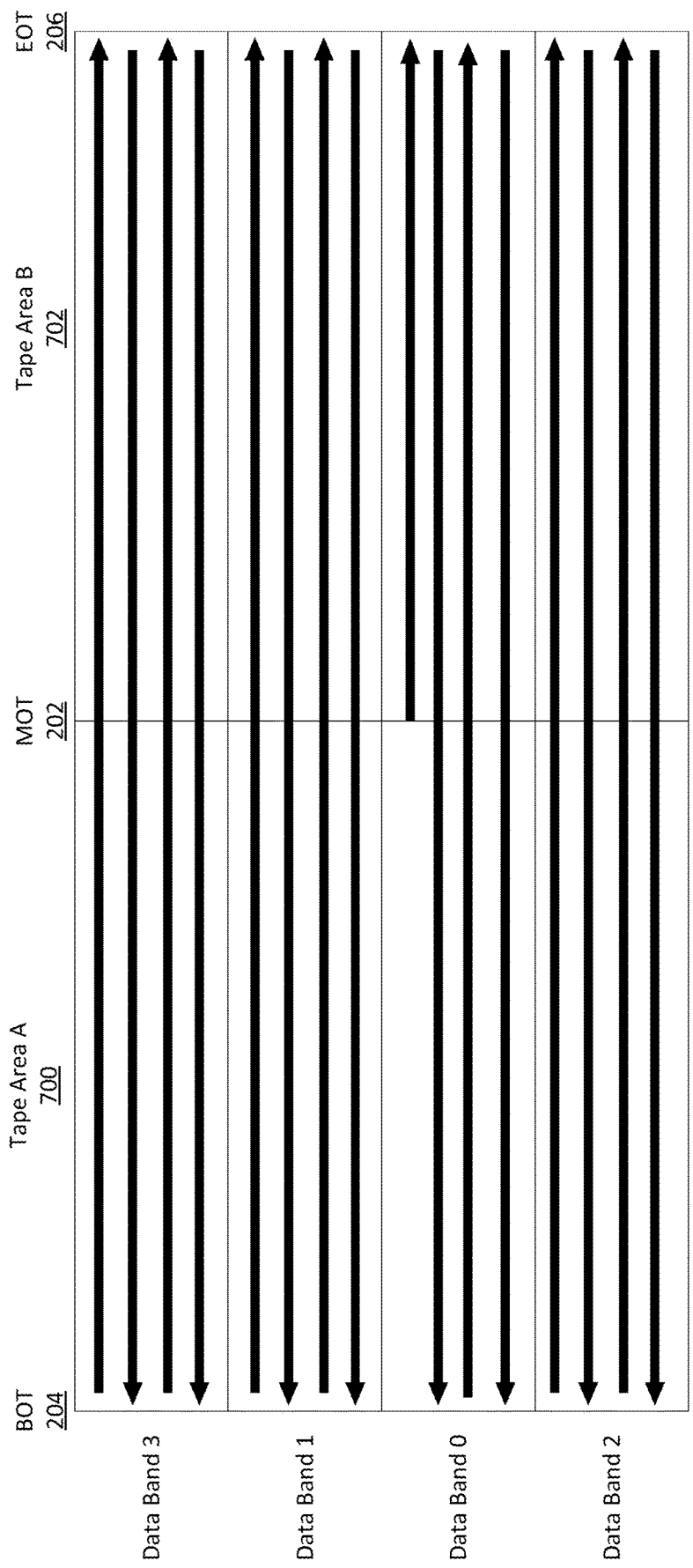

FIGS. 8B-8D illustrate the process of writing for the layout of FIG. 8A. In FIG. 8B, the tape head 130 begins writing from the MOT 202 portion to the EOT 206 portion of data band 0. FIG. 8C then illustrates the tape head 130 performing a wrap turn at the EOT 206 and writing from the EOT 206 portion to the BOT 204 portion, and repeating until data band 0 is full. Finally, FIG. 8D shows the tape head 130 moves from the BOT 204 portion of data band 0 to the BOT 204 of the next sequential data band, data band 1 in this instance. Because the writing process started from the MOT 202 portion of data band 0, there remains a segment of data band 0 from BOT 204 to MOT 202 that is not written to.

Figure 9:
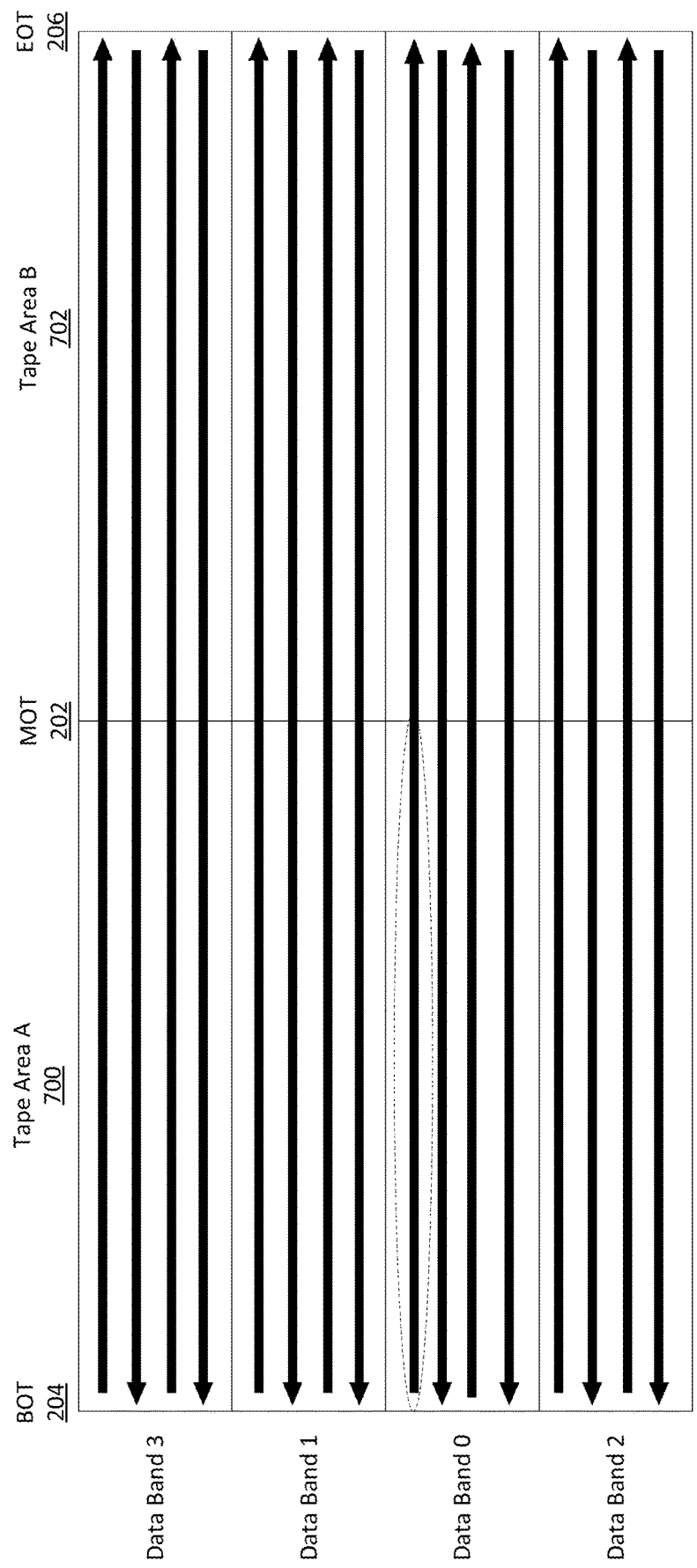
FIG. 9 is a diagram of another possible solution to the storage loss of FIG. 7.

FIG. 9 is a diagram of another possible solution to the storage loss illustrated in FIG. 7. The solution depicted in FIG. 9 is similar to FIG. 8. However, when first writing to a blank tape, the writing may begin from the BOT 204 of data band 0. This can prevent the loss of the storage capacity of a half wrap which is shown circled in FIG. 9. In addition, by always positioning the tape head at the MOT 202 during the standby period, it is possible to realize an efficient format that can maintain access performance. In order to implement the solution of FIG. 9, prior to the very first write to the tape, the tape may be positioned such that the tape head 130 is disposed at the BOT 204 rather than disposed at the MOT 202. Thereafter, the tape head 130 is disposed at the MOT 202 prior to writing any additional data.

Figure 10:
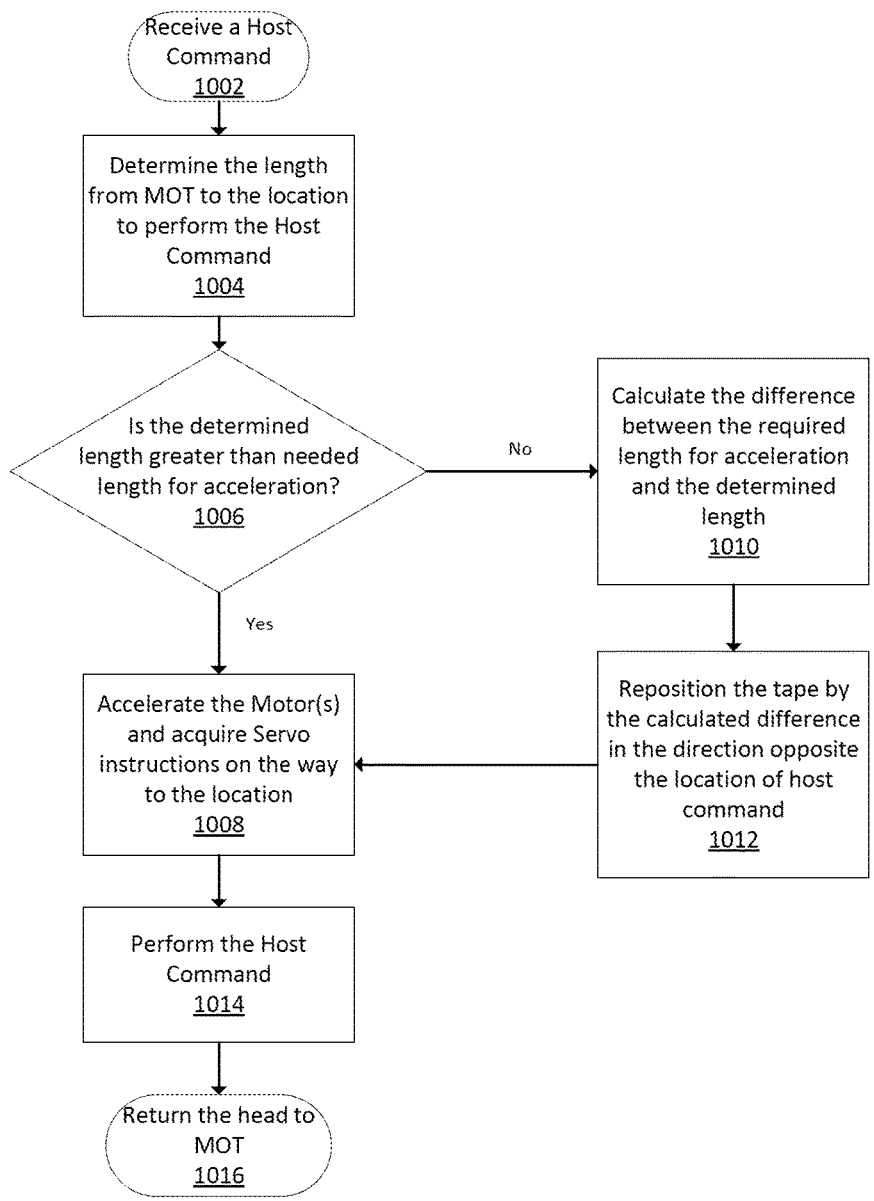
FIG. 10 is a flowchart illustrating a method for writing or reading tape media with midpoint loading.

FIG. 10 is a flowchart illustrating a method for writing or reading tape media with midpoint loading. The flow begins when the control circuitry receives a host command 1002. The control circuitry then determines where the write or read command will be executed and calculates the distances from the MOT to the location of the host command at 1004. The control circuitry then compares the length to the length needed for the one or more motors to accelerate the tape to operational conditions at 1006. If the length is greater than the length needed to accelerate, the control circuitry simply has the one or more motors accelerate the tape and acquire servo instructions at 1008 while traveling to the location to begin execution of the host command.

If the length to travel to perform the command is less than the needed length for acceleration, the control circuitry must calculate the difference of the two lengths at 1010. Then, the control circuitry repositions the tape by the calculated difference in the opposite direction of the location of the host command at 1012. Once the tape has been repositioned to allow for the acceleration distance to be traveled, the flow continues to 1008 where the one or more motors accelerate the tape and the control circuitry acquires servo instructions while moving to the location of the host command. Finally, the tape head performs the host command at 1014 before returning the tape head to a standby position at the MOT at 1016 to finish the flow.

Figure 11:
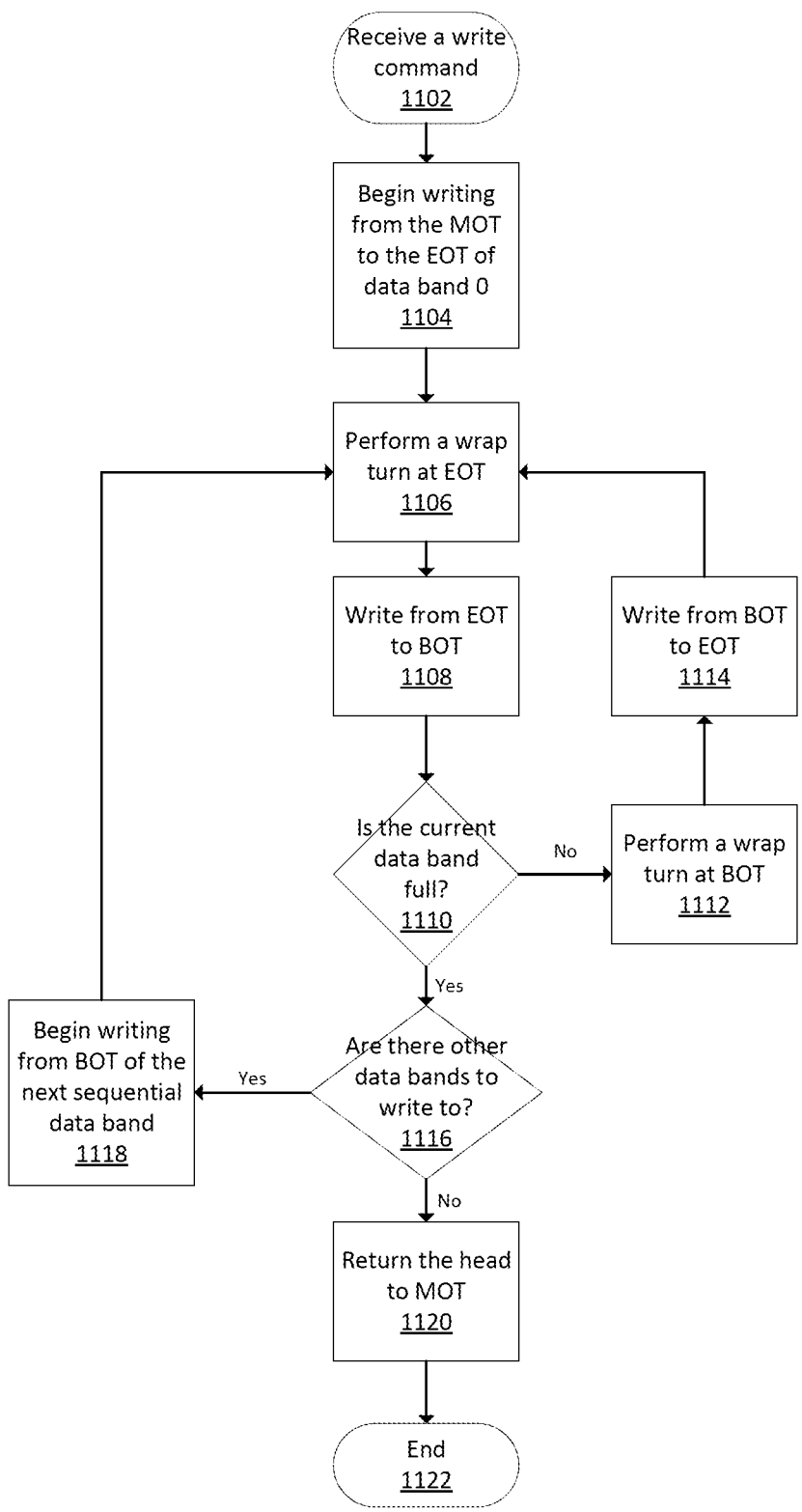
FIG. 11 is a flowchart illustrating a method for writing data to a dual-reel tape system.

FIG. 11 is a flowchart illustrating a method for writing data to a dual-reel tape system. The flow starts when control circuitry receives a host write command at 1102. At block 1104, the tape head begins writing from the MOT to the EOT of data band 0. After the tape head reaches the EOT, the control circuitry performs a wrap turn at the EOT at block 1106. The tape head then writes from the EOT to the BOT during block 1108. When the tape head reaches the BOT, the control circuitry checks if the current data band is full at block 1110. If the data band is not full, the flow moves to block 1112, where a wrap turn is performed at the BOT. After the wrap turn, the tape head may continue to write from the BOT to the EOT at block 1114, until returning to block 1106 and performing a wrap turn at the EOT.

Once the control circuitry determines the current data band is full at block 1110, the flow continues to 1116, where the control circuitry checks for other data bands of the tape to write to. If there are additional data bands, the flow moves to block 1118, where the tape head begins writing from the BOT of the next sequential data band before returning to block 1106. However, if there are no other data bands to write to at 1116, then the circuitry returns the tape head to the MOT in a standby position at block 1120 before ending the flow at block 1122.

Figure 12:
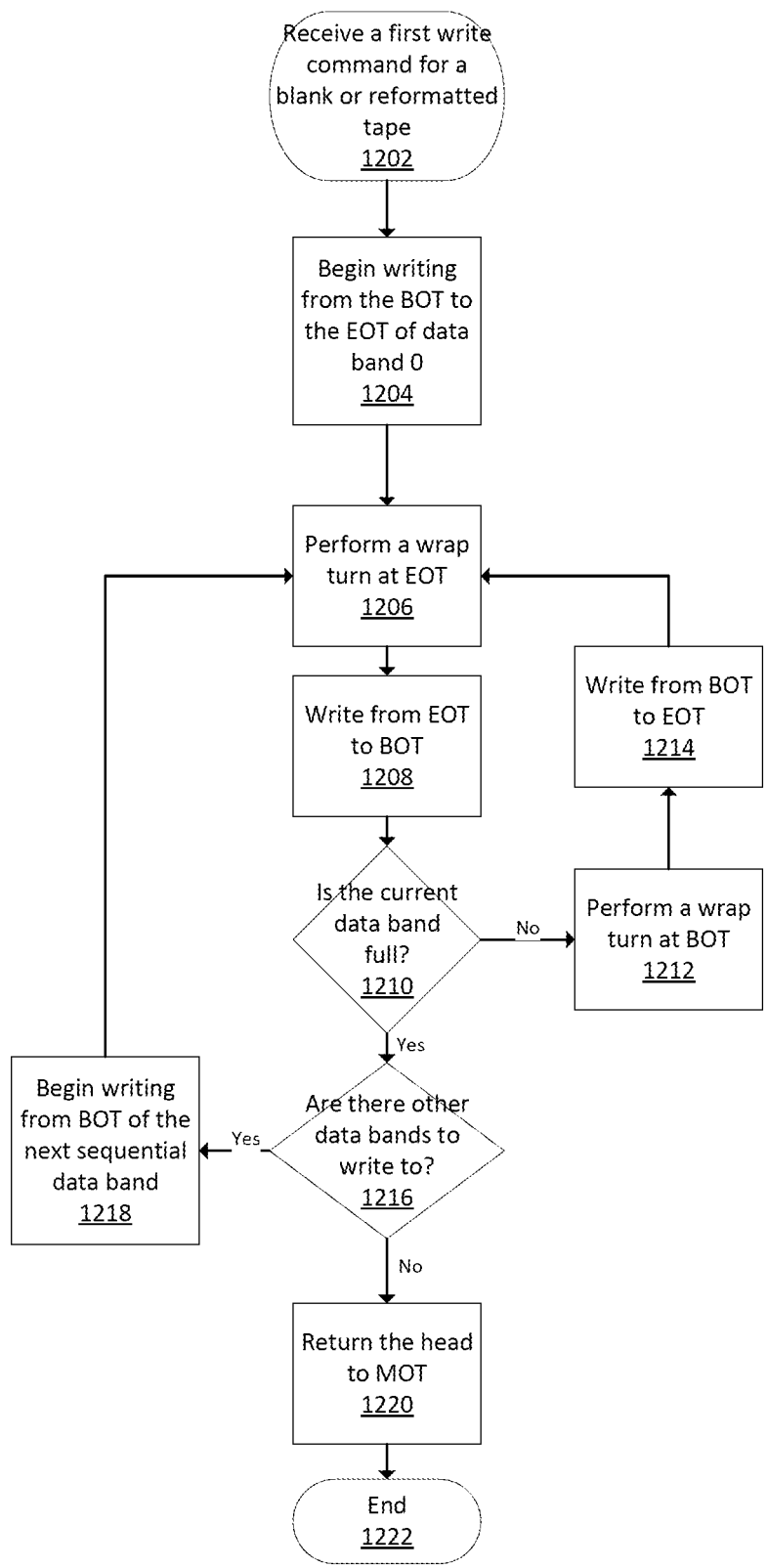
FIG. 12 is a flowchart illustrating a second method for writing data to a dual-reel tape system.

FIG. 12 is a flowchart illustrating a second method for writing data to a dual-reel tape system. The flow starts when control circuitry receives a host write command at 1202 for a blank or reformatted tape. At block 1204, the tape head begins writing from the BOT to the EOT of data band 0. After the tape head reaches the EOT, the control circuitry performs a wrap turn at the EOT at block 1206. The tape head then writes from the EOT to the BOT during block 1208. When the tape head reaches the BOT, the control circuitry checks if the current data band is full at block 1210. If the data band is not full, the flow moves to block 1212, where a wrap turn is performed at the BOT. After the wrap turn, the tape head may continue to write from the BOT to the EOT at block 1214, until returning to block 1206 and performing a wrap turn at the EOT.

Once the control circuitry determines the current data band is full at block 1210, the flow continues to 1216, where the control circuitry checks for other data bands of the tape to write to. If there are additional data bands, the flow moves to block 1218, where the tape head begins writing from the BOT of the next sequential data band before returning to block 1206. However, if there are no other data bands to write to at 1216, then the circuitry returns the tape head to the MOT in a standby position at block 1220 before ending the flow at block 1222.

Figure 13A:
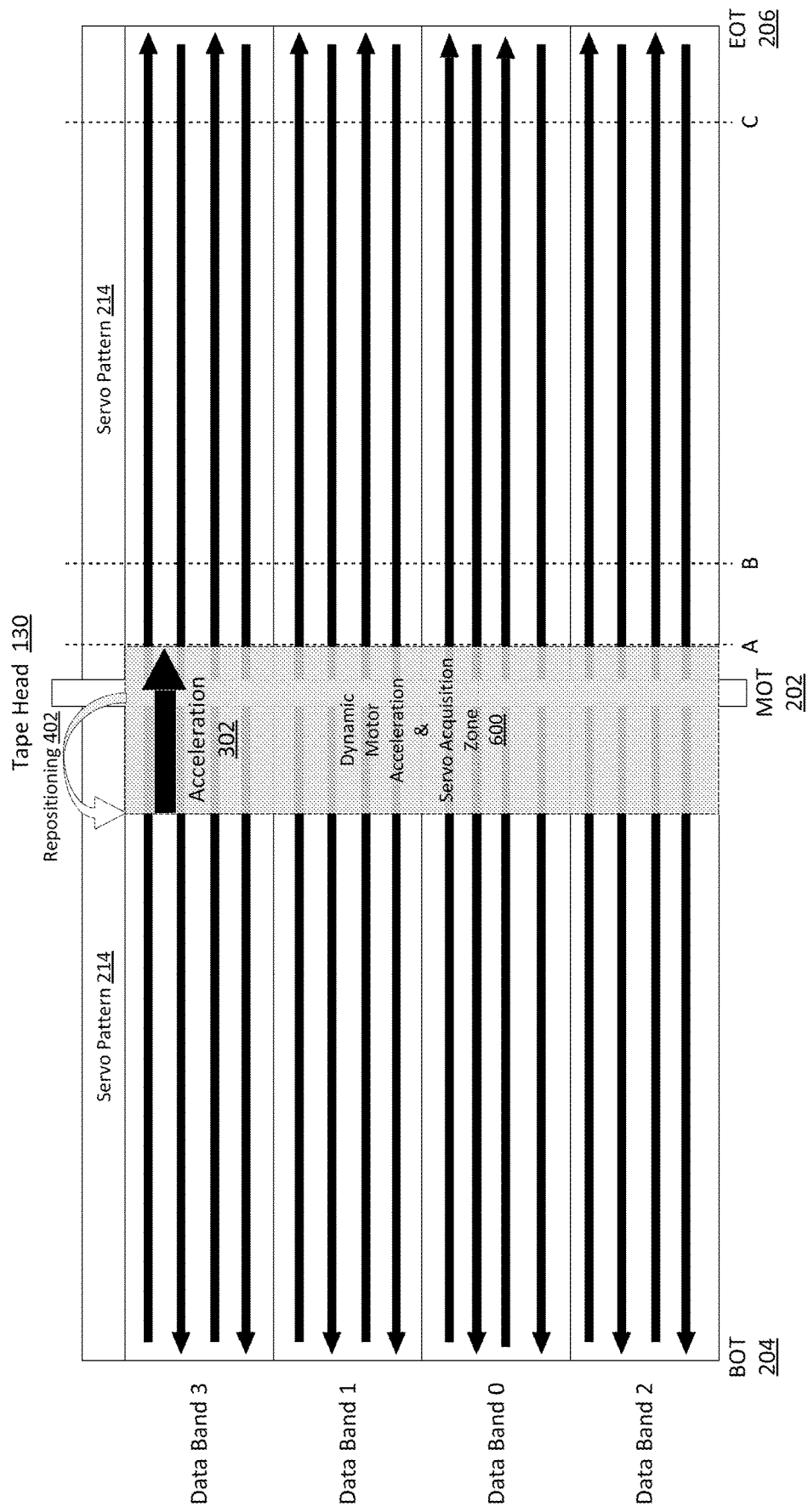
FIGS. 13A-13C are diagrams of different write operation scenarios for a dual-reel tape system.
Figure 13B:
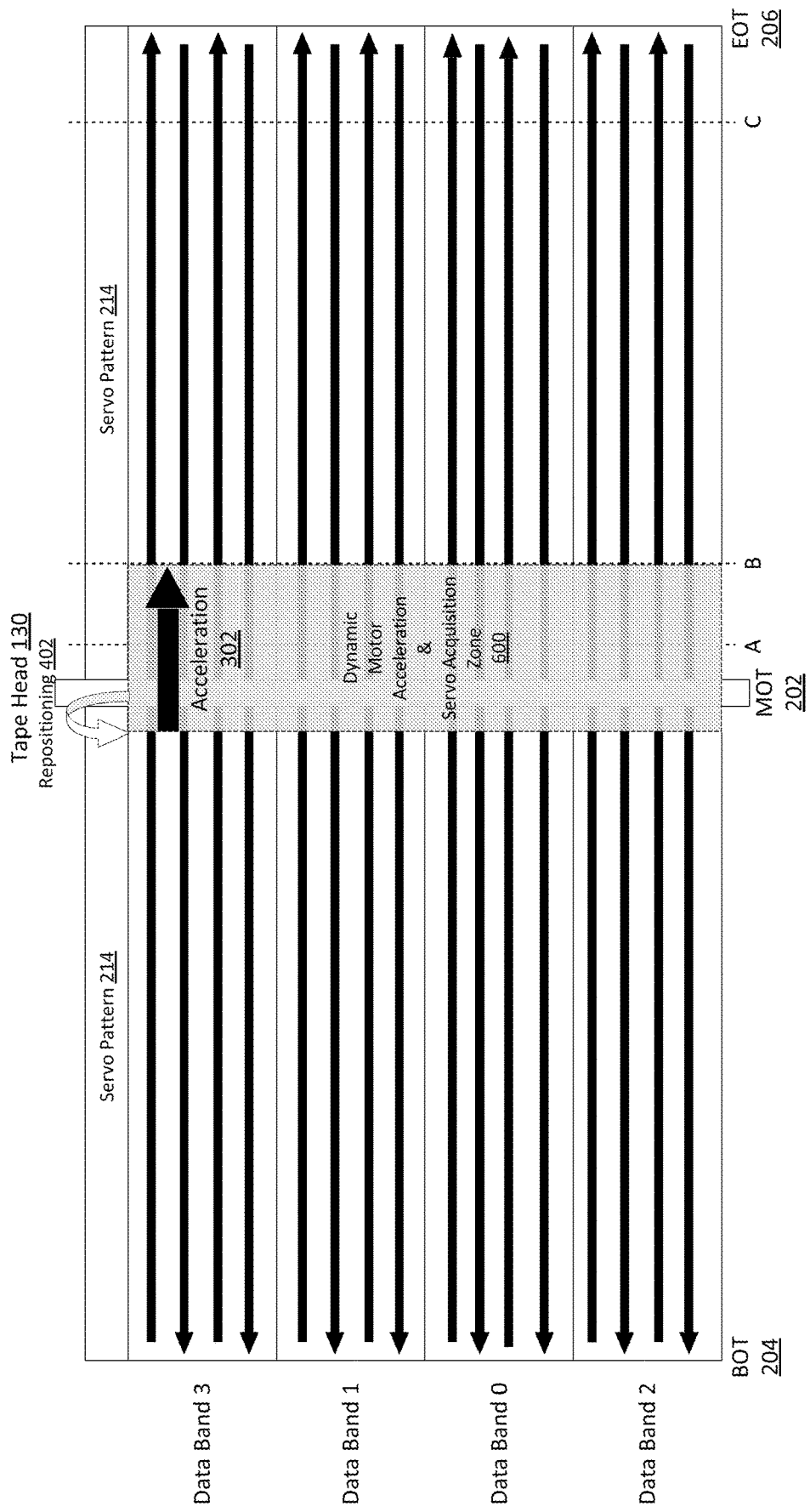
Figure 13C:
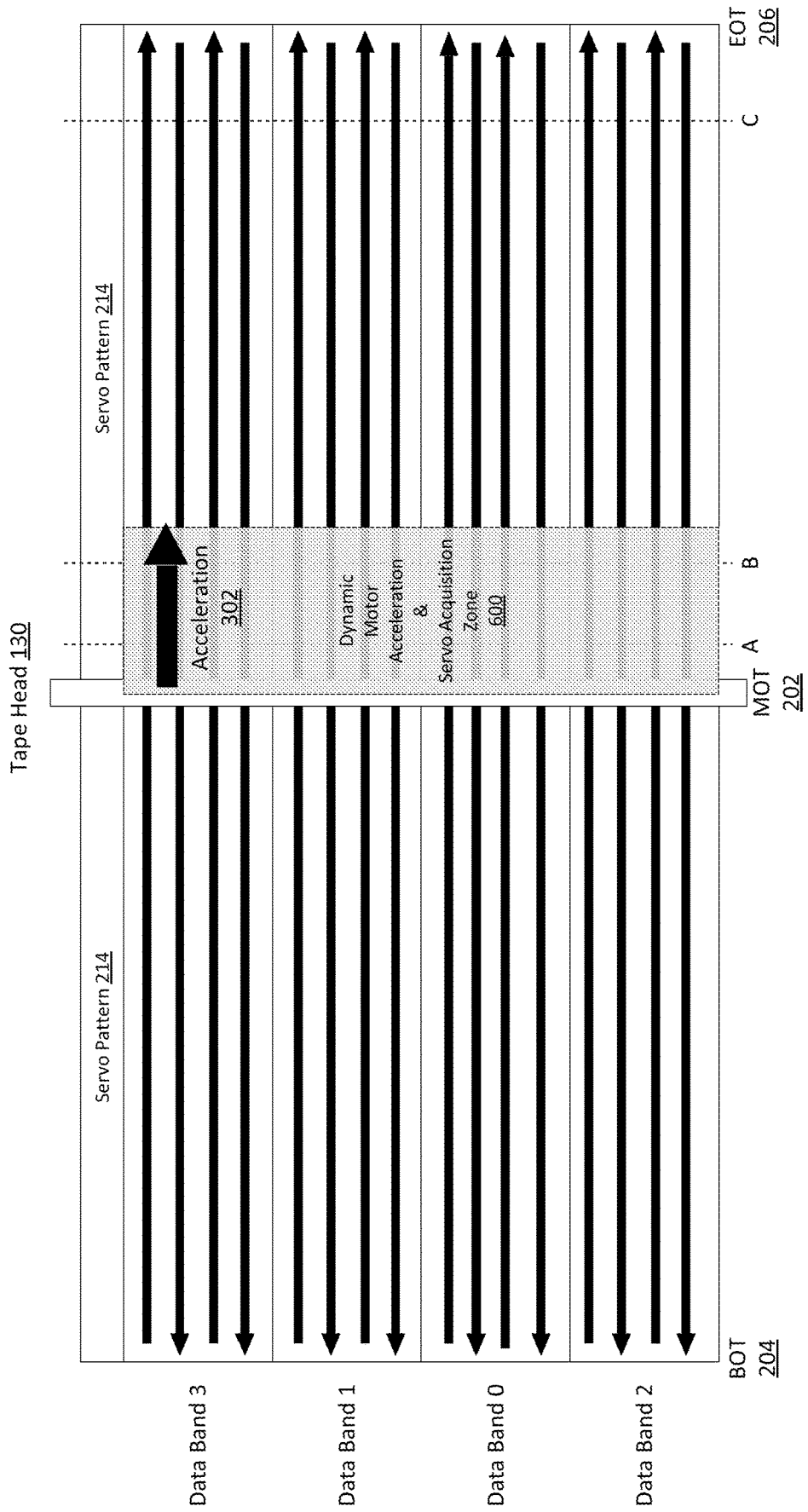

FIGS. 13A-13C are diagrams of different write operation scenarios for a dual-reel system. A dynamic motor acceleration and servo acquisition zone 600 is shown for ease of understanding but does not physically exist on the tape media in any scenario. FIG. 13A shows an instance where a host write command has been received and is to be started at the location marked as A. As location A is within the vicinity of the MOT 202, wherein the vicinity is defined as within the length required for motor acceleration 302, the control circuitry repositions 402 the tape prior to accelerating 302 to perform the host command.

FIG. 13B depicts when a host write command has been received and is to be started at the location marked as B. As before with FIG. 13A, location B is also within the vicinity of the MOT 202. However, location B is further from the MOT 202 than location A was, so the amount of repositioning 402 is less than what was needed for the scenario in FIG. 13A.

FIG. 13C depicts when a host write command has been received and is to be started at the location marked as C. Location C lies outside of the vicinity of the MOT 202, therefore no repositioning is required for the one or more motors to accelerate 302 prior to write command execution.

By repositioning the tape relative to the tape head, additional area of the tape may be used for data storage and hence, storage capacity is increased without increasing the tape length. Additionally, the initial writing to the tape can occur from the beginning of the tape by positioning the tape relative to the tape head such that the tape head, which is usually aligned with the MOT, is aligned with the BOT.

In one embodiment, a data storage device comprises: at least one head configured to access a magnetic tape; one or more reels configured to wind and unwind the magnetic tape; one or more motors configured to actuate the one or more reels; and control circuitry configured to receive a read or write request; determine a first distance from a middle of the magnetic tape to a location on the magnetic tape for data corresponding to the read or write request; position the magnetic tape to allow for an acceleration length to be traveled before reaching the location, wherein the acceleration length is greater than the first distance from the middle of the magnetic tape to the location on the magnetic tape for data corresponding to the read or write request; accelerate the magnetic tape over the acceleration length; and perform the read or write request. Positioning the magnetic tape comprises moving the magnetic tape in a first direction and accelerating the magnetic tape comprises moving the magnetic tape in a second direction opposite the first direction. Moving in the first direction comprises moving a second distance less than the acceleration length or moving in the first direction comprises moving a second distance equal to the acceleration length. The acceleration length is a predetermined length to accelerate the one or more motors to operational conditions. Control circuitry is configured to: receive a second read or write request; determine a second distance from the middle of the magnetic tape to a second location on the magnetic tape for data corresponding to the second read or write request, wherein the acceleration length is less than the second distance from the middle of the magnetic tape to the second location on the magnetic tape for data corresponding to the second read or write request; accelerate the magnetic tape over the acceleration length; and perform the second read or write request. Between determining the second distance and accelerating the magnetic tape, the magnetic tape is not moved in a direction opposite a direction of the accelerating. Writing occurs continuously from a beginning of the magnetic tape to an end of the magnetic tape. Prior to an initial write to the magnetic tape, a beginning of the magnetic tape is positioned adjacent to the at least one head. For subsequent writes after the initial write, the middle of the magnetic tape is positioned adjacent to the at least one head. The one or more reels are configured for a dual-reel removable tape device.

In another embodiment, a data storage device comprises: at least one head configured to access a magnetic tape; one or more reels configured to wind and unwind the magnetic tape; one or more motors configured to actuate the one or more reels; the magnetic tape, wherein the magnetic tape has a Beginning of Tape (BOT) portion of the magnetic tape, a Middle of Tape (MOT) portion of the magnetic tape, and an End of Tape (EOT) portion of the magnetic tape; and control circuitry configured to write data continuously from the BOT portion through the MOT portion and the EOT portion; and either: initially writing from the BOT portion; or initially writing from a middle of the MOT portion. The control circuitry is configured to perform a wrap turn at the BOT portion and the EOT portion. The control circuitry is configured to not perform a wrap turn at the middle of the MOT portion. The control circuitry is configured to move the magnetic tape in a first direction and in a second direction opposite the first direction to write data to the MOT portion. The control circuitry is further configured to only move in the second direction to write to the EOT portion. The at least one head is positioned at the middle of the MOT portion while in a standby mode.

In another embodiment, a data storage device comprises: at least one head configured to access a magnetic tape; one or more reels configured to wind and unwind the magnetic tape; one or more motors configured to actuate the one or more reels; the magnetic tape, wherein the magnetic tape has a BOT portion of the magnetic tape, a MOT portion of the magnetic tape, and an EOT portion of the magnetic tape; and control circuitry, wherein the control circuitry is configured to cause the magnetic tape to move in multiple directions to execute a write command; and write data continuously from the BOT portion through the MOT portion and the EOT portion. The control circuitry is configured to calculate a beginning of a dynamic motor acceleration and servo acquisition zone. Calculating the beginning of the dynamic motor acceleration and servo acquisition zone is based off of a determined location for the write command.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   at least one head configured to access a magnetic tape;
   one or more reels configured to wind and unwind the magnetic tape;
   one or more motors configured to actuate the one or more reels; and
   control circuitry configured to:
      receive a read or write request;
      determine a first distance from a middle of the magnetic tape to a location on the magnetic tape for data corresponding to the read or write request;
      position the magnetic tape to allow for an acceleration length to be traveled before reaching the location, wherein the acceleration length is greater than the first distance;
      accelerate the magnetic tape over the acceleration length; and
      perform the read or write request.

2. The data storage device of claim 1, wherein positioning the magnetic tape comprises moving the magnetic tape in a first direction and wherein accelerating the magnetic tape comprises moving the magnetic tape in a second direction opposite the first direction.

3. The data storage device of claim 2, wherein moving in the first direction comprises moving a second distance less than the acceleration length.

4. The data storage device of claim 2, wherein moving in the first direction comprises moving a second distance equal to the acceleration length.

5. The data storage device of claim 1, wherein the acceleration length is a predetermined length to accelerate the one or more motors to operational conditions.

6. The data storage device of claim 1, wherein the control circuitry is further configured to:
   receive a second read or write request;
   determine a second distance from the middle of the magnetic tape to a second location on the magnetic tape for data corresponding to the second read or write request, wherein the acceleration length is less than the second distance;
   accelerate the magnetic tape over the acceleration length; and
   perform the second read or write request.

7. The data storage device of claim 6, wherein between determining the second distance and accelerating the magnetic tape, the magnetic tape is not moved in a direction opposite a direction of the accelerating.

8. The data storage device of claim 1, wherein writing occurs continuously from a beginning of the magnetic tape to an end of the magnetic tape.

9. The data storage device of claim 1, wherein prior to an initial write to the magnetic tape, a beginning of the magnetic tape is positioned adjacent to the at least one head.

10. The data storage device of claim 9, wherein for subsequent writes after the initial write, the middle of the magnetic tape is positioned adjacent to the at least one head.

11. The data storage device of claim 1, wherein the one or more reels are configured for a dual-reel removable tape device.

12. A data storage device, comprising:
   at least one head configured to access a magnetic tape;
   one or more reels configured to wind and unwind the magnetic tape;
   one or more motors configured to actuate the one or more reels;
   the magnetic tape, wherein the magnetic tape has a Beginning of Tape (BOT) portion of the magnetic tape, a Middle of Tape (MOT) portion of the magnetic tape, and an End of Tape (EOT) portion of the magnetic tape; and
   control circuitry configured to:
      write data continuously from the BOT portion through the MOT portion and the EOT portion after initially writing from a middle of the MOT portion.

13. The data storage device of claim 12, wherein the control circuitry is further configured to perform a wrap turn at the BOT portion and the EOT portion.

14. The data storage device of claim 13, wherein the control circuitry is further configured to not perform a wrap turn at the middle of the MOT portion.

15. The data storage device of claim 12, wherein the control circuitry is further configured to move the magnetic tape in a first direction and in a second direction opposite the first direction to write data to the MOT portion.

16. The data storage device of claim 15, wherein the control circuitry is further configured to only move in the second direction to write to the EOT portion.

17. The data storage device of claim 12, wherein the at least one head is positioned at the middle of the MOT portion while in a standby mode.

18. A data storage device, comprising:
at least one head configured to access a magnetic tape;
one or more reels configured to wind and unwind the magnetic tape;
one or more motors configured to actuate the one or more reels;
the magnetic tape, wherein the magnetic tape has a Beginning of Tape (BOT) portion of the magnetic tape, a Middle of Tape (MOT) portion of the magnetic tape, and an End of Tape (EOT) portion of the magnetic tape; and
control circuitry, wherein the control circuitry is configured to:
cause the magnetic tape to move in multiple directions to execute a write command;
write data continuously from the BOT portion through the MOT portion and the EOT portion; and
calculate a beginning of a dynamic motor acceleration and servo acquisition zone.

19. The data storage device of claim 18, wherein the calculating the beginning of the dynamic motor acceleration and servo acquisition zone is based off of a determined location for the write command.

\* \* \* \* \*